United States Patent [19]
Eckardt

[11] Patent Number: 5,402,454
[45] Date of Patent: Mar. 28, 1995

[54] PROCESS AND DEVICE FOR OBTAINING SAMPLES FROM THE ATMOSPHERE IN A CLOSED GASTIGHT VESSEL, PREFERABLY FROM THE REACTOR SAFETY VESSEL OF A NUCLEAR POWER STATION

[75] Inventor: Bernd Eckardt, Bruchköbel, Germany

[73] Assignee: Siemens Aktiengesellschaft, Munich, Germany

[21] Appl. No.: 195,626

[22] Filed: Feb. 14, 1994

[30] Foreign Application Priority Data

Aug. 14, 1991 [DE] Germany .................. 41 26 894.6

[51] Int. Cl.$^6$ ............................................ G21C 17/00
[52] U.S. Cl. ................................. 376/245; 376/309; 376/314; 73/863.83
[58] Field of Search ............... 376/245, 250, 260, 308, 376/309, 314, 463; 73/863.21, 863.83, 864.34; 422/83, 88, 102

[56] References Cited

U.S. PATENT DOCUMENTS

| | | | |
|---|---|---|---|
| 3,590,247 | 6/1971 | Holford | 376/314 |
| 3,788,813 | 1/1974 | Busch | 376/256 |
| 4,863,766 | 9/1989 | Eckardt | 376/314 |
| 4,873,050 | 10/1989 | Eckardt | 376/309 |
| 5,017,331 | 5/1991 | Eckardt | 376/313 |

FOREIGN PATENT DOCUMENTS

| | | |
|---|---|---|
| 0285845 | 10/1988 | European Pat. Off. . |
| 0338324 | 10/1989 | European Pat. Off. . |
| 0419994 | 4/1991 | European Pat. Off. . |
| 0498016 | 8/1992 | European Pat. Off. . |
| 2152170 | 4/1973 | France . |

OTHER PUBLICATIONS

"Gasprobeentnahme für den gasgekühlten ... ", Braun et al. Atompraxis 11, vol. 4, 1965, pp. 185–190.
Patent Abstract of Japan No. 57-77942 (Kenmochi), dated May 15, 1982.

*Primary Examiner*—Daniel D. Wasil
*Attorney, Agent, or Firm*—Herbert L. Lerner; Laurence A. Greenberg

[57] ABSTRACT

A process for obtaining a sample from an atmosphere in a closed gastight vessel, preferably from a reactor safety vessel of a nuclear power station, includes passing a sample through a venturi nozzle immediately upon entry of the sample into a sample-taking container in a vessel. The sample is mixed in the venturi nozzle with a transport fluid serving as a washing liquid. Gaseous constituents of the sample being soluble and/or condensable in the washing liquid are subsequently discharged together with the washing liquid from the sample-taking container and from the vessel by triggering a pressure reduction. A device for obtaining samples from an atmosphere in a closed gastight vessel, preferably from a reactor safety vessel of a nuclear power station, includes a sample-taking container having a bottom and a given volume. A washing liquid is disposed in the sample-taking container and has a volume being at most approximately equal to half of the given volume. A venturi nozzle dips into the washing liquid in the sample-taking container above the bottom. An inlet channel leads into the sample-taking container below the venturi nozzle.

16 Claims, 3 Drawing Sheets

PROCESS AND DEVICE FOR OBTAINING SAMPLES FROM THE ATMOSPHERE IN A CLOSED GASTIGHT VESSEL, PREFERABLY FROM THE REACTOR SAFETY VESSEL OF A NUCLEAR POWER STATION

CROSS-REFERENCE TO RELATED APPLICATION

This application is a Continuation of International Application Ser. No. PCT/DE92/00679, filed Aug. 13, 1992.

BACKGROUND OF THE INVENTION

FIELD OF THE INVENTION

The invention relates to a process and a device for obtaining a sample from the atmosphere in a closed gastight vessel, preferably from the reactor safety vessel of a nuclear power station, wherein the sample is introduced into a sample-taking container and constituents of the sample which are soluble and/or condensable in a transport or vehicle fluid are discharged from the vessel together with the transport fluid and gaseous constituents of the sample. Such a process and a device suitable for carrying out the process are known from German Published, Non-Prosecuted Application DE 39 32 712 A1, corresponding to Published European Application No. 0 419 994 A1 and to U.S. application Ser. No. 07/590,151, filed Sep. 28, 1990, now abandoned.

Gastight vessels are frequently used for enclosing installations in which substances that must not pass into the environment of the vessel are reacted. Such vessels, which are also known as containments, are normally accessible while the installation enclosed in them is working correctly, and at the same time they also permit problem-free monitoring of the atmosphere contained in them. However, in the event of faults, the vessels are hermetically sealed in accordance with regulations, so that difficulties are encountered in obtaining samples from the outside which are representative of the atmosphere.

When taking samples, the different states of the atmosphere, such as "dry" and "moist", as well as the behavior of the substances in gas or vapor form and of airborne solid and liquid aerosols are of considerable importance. In particular, effects such as depositions of condensing vapors or large aerosols ($>1$ $\mu$m) upstream (in the direction of flow) of a sample taking device may result in a highly erroneous assessment of the composition and of a radioactive contamination of the atmosphere.

In the device referred to above, sample taking fittings which are connected serially are provided in the run of a pipe loop, with each of them being able to be operated by means of a pneumatic or hydraulic line. Two penetrations of the wall of the vessel are then needed for the pipe loop in addition to one such penetration for each pneumatic or hydraulic line. Since the strength and tightness of the vessel must not be impaired thereby, it entails an expense which is not inconsiderable. Furthermore, the mechanically active sample taking fittings must also remain capable of operating under and after accident conditions, such as with temperatures above 500° C. and extreme radiation loads of over 10 KGy/h, so that stringent demands on materials, particularly for moving parts, have to be met.

SUMMARY OF THE INVENTION

It is accordingly an object of the invention to provide a process and a device for obtaining samples from the atmosphere in a closed gastight vessel, preferably from the reactor safety vessel of a nuclear power station, which overcome the hereinafore-mentioned disadvantages of the heretofore-known methods and devices of this general type and which obtain representative samples of the atmosphere prevailing in the vessel from the outside, without impairing the strength and tightness of the latter, while depositions of constituents of the samples, which would falsify the results of the measurement, are reliably avoided and the taking of samples is effected with components which can also be constructed for faulty conditions and which are preferably mechanically passive.

With the foregoing and other objects in view there is provided, in accordance with the invention, a process for obtaining a sample from an atmosphere in a closed gastight vessel, preferably from a reactor safety vessel of a nuclear power station, which comprises passing a sample through a venturi nozzle immediately upon entry of the sample into a sample-taking container in a vessel; mixing the sample in the venturi nozzle with a transport fluid serving as a washing liquid; and subsequently discharging gaseous constituents of the sample being soluble and/or condensable in the washing liquid together with the washing liquid from the sample-taking container and from the vessel by triggering by a sudden pressure reduction.

In accordance with another mode of the invention, an inlet channel, through which the sample flows before reaching the venturi nozzle, is flushed with the washing liquid contained in the sample-taking container, before the sample is discharged.

In accordance with a further mode of the invention, the velocity of flow of the sample in the venturi nozzle or nozzles is slightly, preferably 10% to 30%, below the critical nozzle velocity, so long as no condensation of the sample occurs in the washing liquid, and the velocity of flow is increased to the critical nozzle velocity as soon as the sample condenses, at least partially, in the washing liquid.

In accordance with an added mode of the invention, there is provided a process which comprises reacting gaseous constituents of the sample and of the transport fluid chemically with one another.

In accordance with an additional mode of the invention, there is provided a process which comprises varying a level height of the washing liquid, preferably in the inlet channel, by pressure changes in the transport fluid, and raising the washing liquid at least once after the sample has flowed in to a height of an inlet opening at a free end of the inlet channel for the sample.

In accordance with yet another mode of the invention, there is provided a process which comprises adjusting a difference in pressure between an atmosphere in the vessel and an interior of the sample-taking container to up to 5000 hPa.

In accordance with yet a further mode of the invention, there is provided a process which comprises adjusting a temperature of the washing liquid at the beginning of a sample taking process to be slightly lower than that of an atmosphere in the vessel.

In accordance with yet an added mode of the invention, there is provided a process which comprises retaining elementary organic iodine, CO, $CO_2$ and other gas from the sample in the washing liquid, by inactive iodine additions and variation of the pH value of the washing liquid.

In accordance with yet an additional mode of the invention, there is provided a process which comprises diluting the washing liquid after being drawn off by suction from the sample-taking container, until the radioactivity of the sample is lower than $10^9$ Bq/m$^2$.

In accordance with again another mode of the invention, there is provided a process which comprises separating the sample before its assessment into gaseous constituents and washing liquid containing other parts of the sample, and drawing off the sample by suction through a throttle working in the laval velocity range, through a water separator and into a vacuum vessel.

In accordance with again a further mode of the invention, there is provided a process which comprises distributing each individual sample over a plurality of transport containers for transport purposes.

In accordance with again an added mode of the invention, there is provided a process which comprises subjecting the sample-taking container to superatmospheric pressure, such as by introducing nitrogen, until a bursting disk at a free end of the inlet channel breaks, to initiate obtaining a sample.

With the objects of the invention in view, there is also provided a device for obtaining samples from an atmosphere in a closed gastight vessel, preferably from a reactor safety vessel of a nuclear power station, comprising a sample-taking container having a bottom and a given volume; a washing liquid being disposed in the sample-taking container and having a volume being at most approximately equal to half of the given volume; a venturi nozzle dipping into the washing liquid in the sample-taking container above the bottom; and an inlet channel leading into the sample-taking container below the venturi nozzle.

In accordance with another feature of the invention, the volume of the washing liquid is slightly greater than the volume of an inlet channel, serving for the admission of the samples, between the free end of the channel and the bottom of the sample-taking container.

In accordance with a further feature of the invention, the venturi nozzle is replaced by filling bodies, which serve as flow distributors, and a plurality of nozzles in the bottom of the sample-taking container, with an inlet opening of the inlet channel at the free end of the latter being closed by a bursting disk during the normal use of the vessel.

In accordance with an added feature of the invention, the sample-taking container has a dome, and there is provided a filling and emptying line at the bottom for the washing liquid, and a gas line connected to the dome.

In accordance with an additional feature of the invention, the sample-taking container has a side, the filling and emptying line is guided upwards at the side, and there is provided an injector connecting the filling and emptying line to the gas line laterally above the dome.

In accordance with yet another feature of the invention, the sample-taking container is disposed inside the vessel, preferably inside a reactor safety vessel.

In accordance with yet a further feature of the invention, there is provided a line starting from the injector and passing to the outside through an outer wall of the vessel, and a throttle in the line for limiting a flow through the line.

In accordance with yet an added feature of the invention, there is provided a sorption filter for organoiodine being inserted into the line.

In accordance with yet an additional feature of the invention, there are provided polished or teflon-coated surfaces, preferably in the inlet channel, being in contact with the sample.

In accordance with again another feature of the invention, the sample-taking container has built-in fittings, and the inlet channel, the sample-taking container with all of the built-in fittings, the filling and emptying line, the gas line, the injector and the line starting from the injector are formed essentially of radiation-resistant material, such as special steel.

In accordance with again a further feature of the invention, volume of the washing liquid filling the sample-taking container is substantially between 2 and 3 liters.

In accordance with a concomitant feature of the invention, there are provided means for maintaining a constant velocity of flow of the sample by throttling in the venturi nozzle and/or with a throttle disposed outside the vessel.

The process according to the invention and the device according to the invention are very advantageous because they make it possible to obtain unadulterated samples of the atmosphere in a hermetically sealed vessel and for this purpose require only a single bushing for a pipe through the wall of the vessel. Impairment of the strength and tightness of the vessel are thereby virtually impossible. This is still true if, in the event of the direct extraction of washing liquid, a second pipe is passed through the wall of the vessel.

Other features which are considered as characteristic for the invention are set forth in the appended claims.

Although the invention is illustrated and described herein as embodied in a process and a device for obtaining samples from the atmosphere in a closed gastight vessel, preferably from the reactor safety vessel of a nuclear power station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
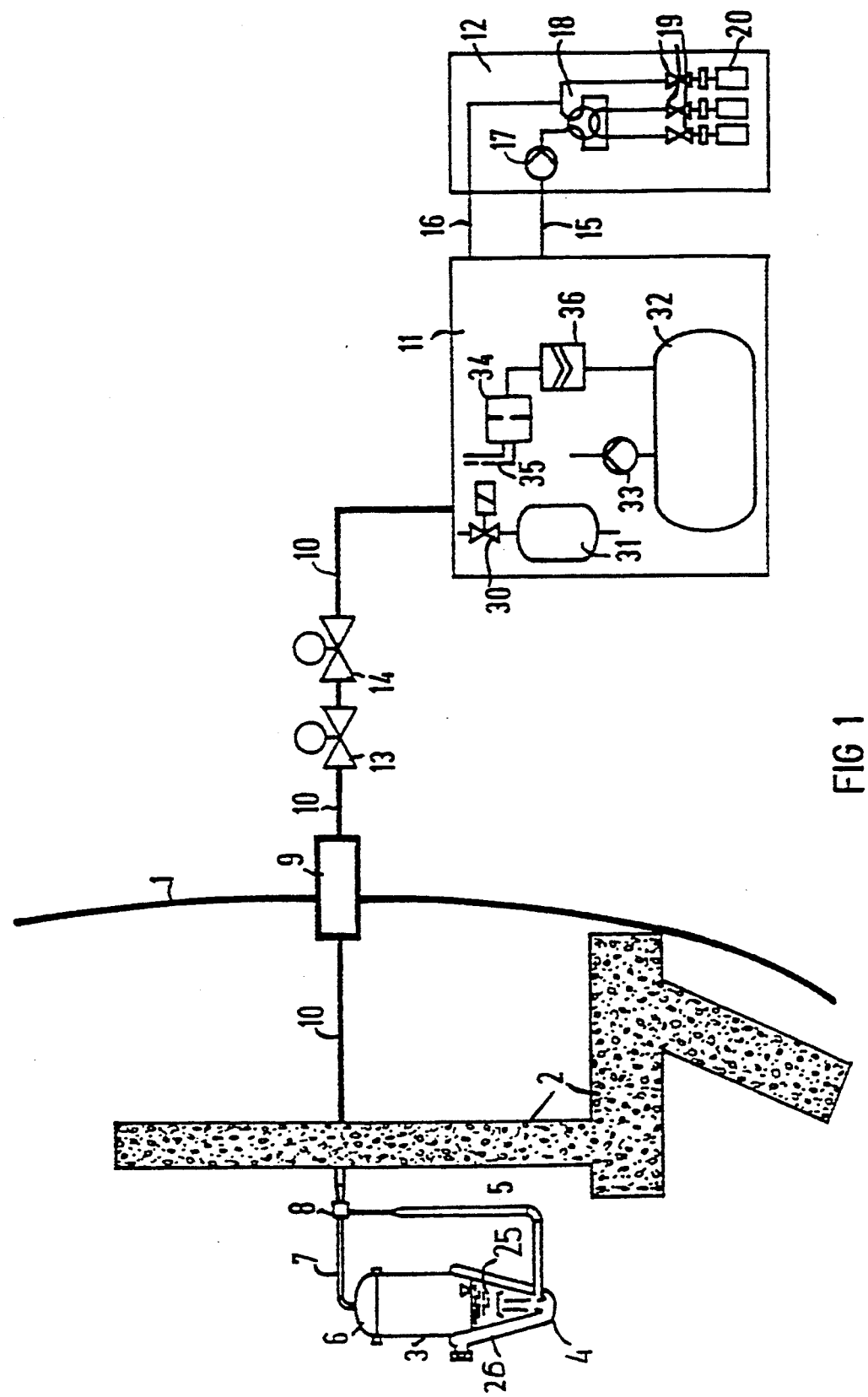
FIG. 1 is a fragmentary, diagrammatic, longitudinal-sectional view of a reactor safety vessel of a nuclear power station and a schematic diagram of a circuit for applying a process of the invention to the reactor safety vessel.

Referring now in detail to the figures of the drawing, in which the same reference numerals are used for components corresponding to one another, and first, particularly, to FIG. 1 thereof, there is seen a reactor safety vessel 1 of a nuclear power station (which is not further shown) that includes a reinforced concrete structure 2

(shown in sections) and at least one non-illustrated reactor pressure vessel of a nuclear reactor. The reinforced concrete structure 2 carries a sample-taking container 3 in a manner which is not illustrated in greater detail. The container is connected to an injector 8 by means of a filling and emptying line 5 which starts from the immediate vicinity of a bottom 4 of the container, and by means of a gas line 7 starting from its dome 6. The injector 8 is in turn connected by a line 10 to a sample sorting and suction device 11. The line 10 has a bushing 9 which penetrates the wall of the reactor safety vessel 1. The sample sorting device 11 serves at the same time to control the sample-taking container 3 and to control a sample draw-off and dilution device 12. The difference in pressure between the atmosphere in the vessel and the interior of the sample-taking container amounts to up to 5000 hPa.

An inlet channel 26, the sample-taking container 3 with all of its built-in fittings, the filling and emptying line 5, the gas line 7, the injector 8 and the line 10 starting from the injector 8, are made essentially of radiation-resistant material, for example special steel.

Two serially connected controllable valves 13 and 14 are installed in the line 10 between the bushing 9 and the sample sorting and suction device 11. In addition, a non-illustrated throttle may be provided, which restricts the flow through the line 10, and a sorption filter for organoiodine may be inserted into the line.

The sample draw-off and dilution device 12 is connected through a feed line 15 and a return line 16 to the sample sorting device 11 and contains a sample feed pump 17, a distributor 18 and connection fittings 19 for a plurality of sample transport containers 20. The samples are taken in the sample transport containers 20 to an examination laboratory for accurate assessment. Before their assessment, the samples are separated into gaseous constituents and washing liquid 25 which contains other parts of the samples, after the samples have been drawn off by suction through a throttle 34 working in the laval velocity range and through a water separator 36 into a vacuum vessel 32.

The containment atmosphere radioactivity is detected and/or the composition thereof is detected there by gas chromatography and $\gamma/\beta$ measurement. Radioactivity can also be continuously measured in the partial flow of outgoing gas and in the washing liquid circuit. The return of the gas and liquid activities into the vessel 1 is effected in a manner which is not shown, but is advantageously carried out through the sample-taking container 3.

In the sample sorting and suction device 11 a separator 31, for example in the form of a centrifugal separator and collector for separating the washing liquid, and a quick-opening valve 30, are accommodated. In the vacuum or storage and suction vessel 32 a vacuum of less than 500 hPa, which is necessary for drawing off by suction, is produced by means of a pump 33, and the washing liquid 25 being drawn off by suction is stored. During sample taking operation, the throttle 34 is operated predominantly with critical stress relief, so that a constant volume flow is taken out over the entire operating range of the sample taking device, from a maximum of about 10000 hPa down to normal atmospheric pressure, and additional throughput regulating means are not necessary.

Through the use of a secondary pipe heating system 35, any condensate formed upstream of the throttle 34 is vaporized again and passed in vapor form through the throttle 34. Level adjustment and system temperature control are effected through non-illustrated media connections for deionized water, steam and nitrogen. In a modified variant, the system has its own non-illustrated integrated evaporator. The washing liquid 25 in the sample-taking container 3 is varied, for example with respect to pH value from acid to alkaline, so that elementary iodine and organoiodine are selectively retained. The retention of organoiodine is therefore possible even in an externally disposed sorption filter 36. Through pH value variation followed by measurement, it is also possible to measure the composition of the gas with respect to $CO_2$, CO, etc., as well as, with or without washing liquid, the $H_2$ concentration. The sample-taking container 3 is electropolished or teflon-coated on its surface and is constructed in such a way that depositions are largely avoided. Measuring time intervals can be flexibly adapted to a fault sequence and other events in the vessel 1. After being drawn off by suction from the sample-taking container 3, the washing liquid 25 is diluted until the radioactivity of the sample is lower than $10^9$ Bq/m$^2$.

In the case of embodiments in the form of a two-line system, the filling and emptying line 5 of the sample-taking container 3 can be led separately into the separator 31 in the sorting device 11, so that continuous measurement operation is achieved and/or minimization of the washing liquid 25 in the gas line 7 is achieved.

The previously mentioned functional principle can also be applied to the configuration of a sample-taking container 3 directly downstream of the valves 13 and 14, including the back-washing action in an inlet line, while largely retaining the advantages of the process, and can also be used as a sample taking and measuring system in exhaust air systems.

In configurations including a plurality of sample taking devices, gas can be taken out through one sample taking device and continuous pumping-back can be effected through another sample taking device.

Through the use of a non-illustrated accompanying supply system which, for example, is battery-fed, for the electrical and instrumentation control of the sample taking system, operation is ensured even in the event of current failure.

Figure 2:
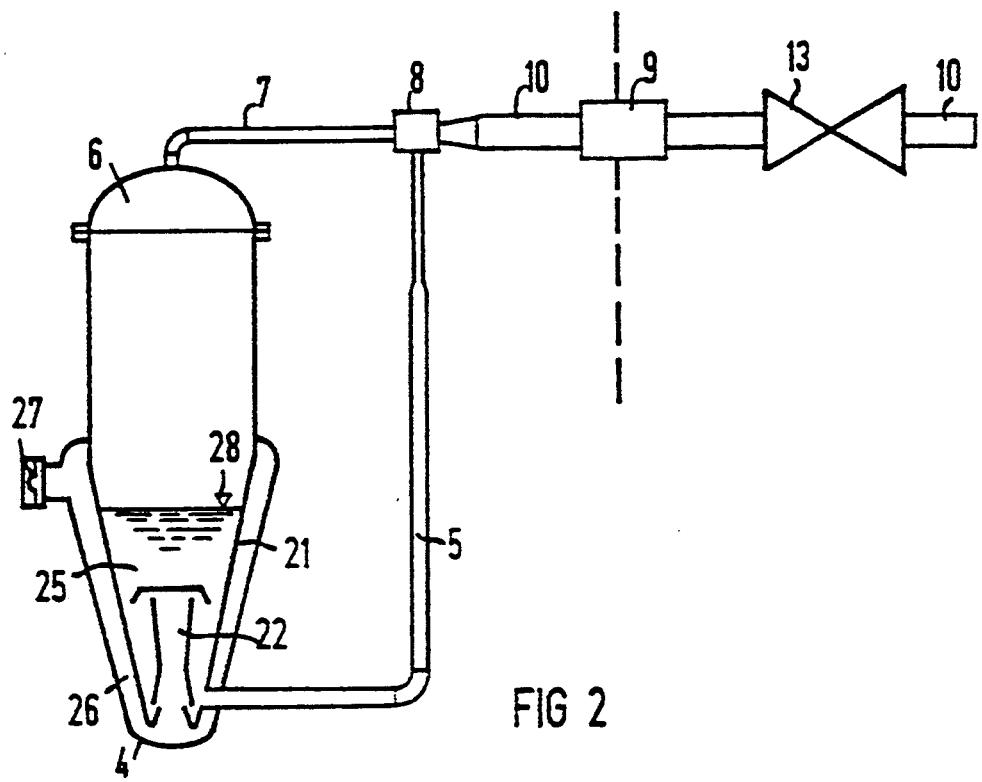
FIGS. 2 to 4 are enlarged elevational views of various configurations of appertaining sample-taking containers.
Figure 3:
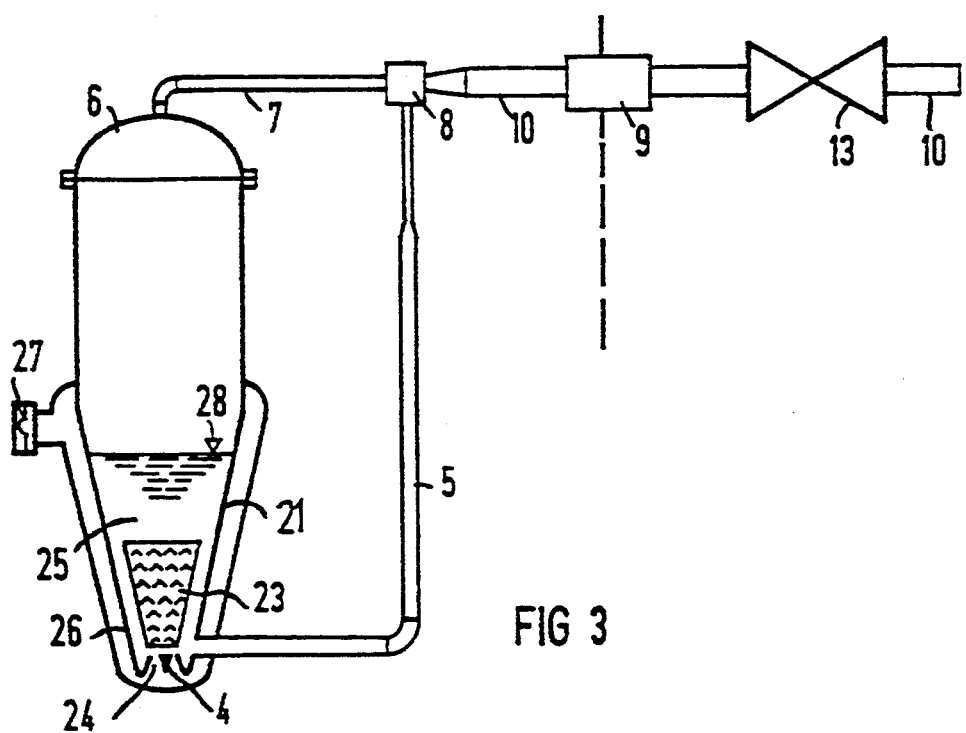
Figure 4:
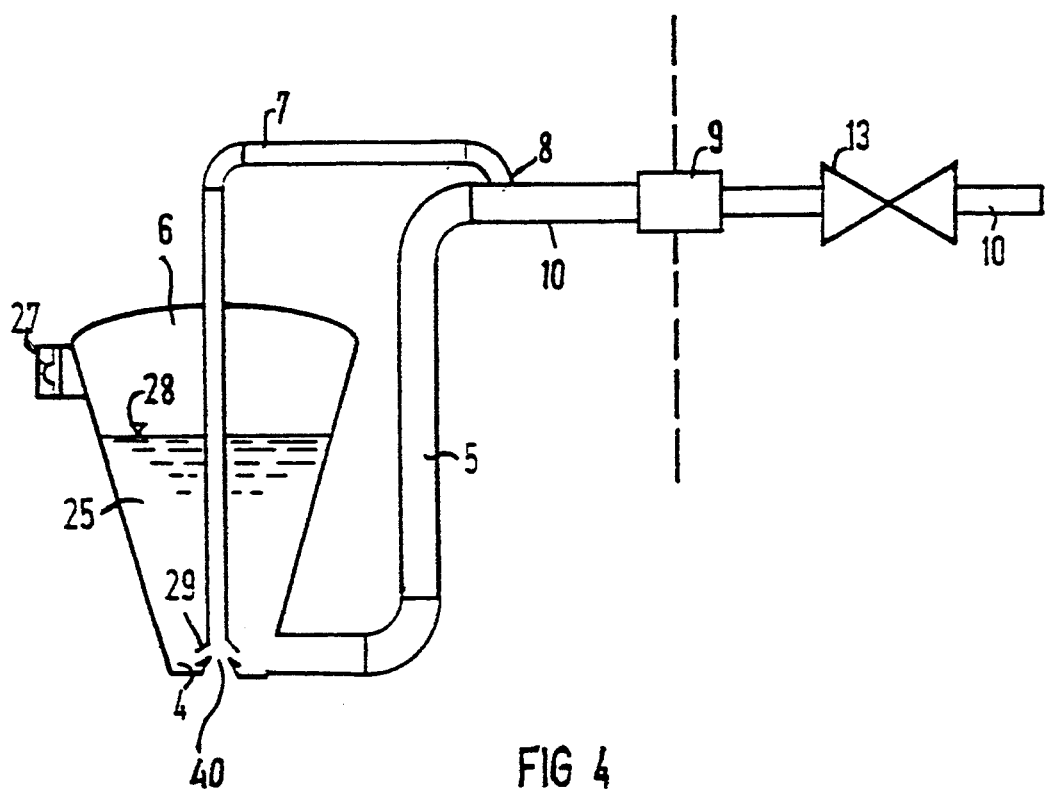

FIGS. 2 and 3 show a sample-taking container 3 having a conical, downwardly tapering lower part 21. In the exemplary embodiment shown in FIG. 2 the lower part 21 surrounds a venturi nozzle 22 and in the exemplary embodiment shown in FIG. 3 the lower part 21 surrounds a filling body, which serves as a flow distributor 23, and a plurality of nozzles 24 in the bottom 4. The lower part 21 is filled with a transport or conveying fluid which at the same time serves as the washing liquid 25. The filling and emptying line 5 leads into the lower part 21 at the bottom 4. The dome 6 is filled with gas. The velocity of a flow of the sample in the venturi nozzle 22, in the venturi nozzles 24 and in a venturi nozzle 40 shown in FIG. 4, is slightly, and preferably 10% to 30%, below a critical nozzle velocity, as long as no condensation of the sample occurs in the washing liquid 25. The velocity of flow is increased to the critical nozzle velocity as soon as the sample condenses, at least partially, in the washing liquid 25, with the sample-taking container 3 being operated under the conditions of pressure and temperature prevailing in the vessel 1. Gaseous constituents of the sample and of the transport fluid can then react chemically with one another.

In the exemplary embodiments shown in FIGS. 2 and 3, the part 21 is surrounded by the inlet channel 26 which has a bottom end that feeds the venturi nozzle 22 or the nozzles 24. The inlet channel 26 has a top end which is situated approximately at the height of a transition from the part 21 to a cylindrical part of the sample-taking container 3. The top end of the inlet channel 26 is gas-tightly closed by a bursting disk 27 during normal operation of the reactor safety vessel 1.

In the exemplary embodiment shown in FIG. 4, the gas line 7 passes through the sample-taking container 3 over its entire height, down to the bottom 4 and is open at the bottom end. In this type of embodiment, slot-like openings 29 are provided just above the bottom 4 in the gas line 7, so that the bottom end of the gas line 7 in the sample-taking container itself acts as a venturi nozzle 40. An inlet channel leading into the lower part of the sample-taking container 3 is dispensed with in this embodiment. Instead, however, the bursting disk 27 is disposed directly on the upper part of the sample-taking container 3, for the ventilation and pressure relief of the latter.

In each case a venturi nozzle 22, 24, 40 dipping into a washing liquid 25 is provided in the sample-taking container 3, above the bottom 4 of the latter. The volume of the washing liquid 25 is at most approximately equal to half the volume of the sample-taking container 3, that is to say about 2 to 3 liters, and the inlet channel 26 or the gas line 7 leads into the sample-taking container 3 below the venturi nozzle 22, 24, 40.

The process for obtaining samples from the atmosphere in the reactor safety vessel 1 is initiated by filling the sample-taking container 3 with the transport fluid 25 through the line 10 and the filling and emptying line 5. The temperature of the washing liquid 25 at the beginning of a sample taking process is slightly lower than that of the atmosphere in the vessel 1. At the end of the filling operation the bursting disk 27 is caused to react and the transport fluid has reached a level 28. The pressure in the line 10 is thereupon lowered, so that a sample of the atmosphere from the reactor safety vessel 1 flows into the sample-taking container 3. The velocity of flow of the sample is kept constant by throttling taking place in the venturi nozzle 22, 24, 40 and/or in the throttle 34 disposed outside the vessel 1. In this case the sample is mixed in the venturi nozzle 22 shown in FIG. 2, in the flow distributor 23 shown in FIG. 3 or in the venturi nozzle 40 from the gas line 7 and the openings 29 shown in FIG. 4, with the transport fluid acting as the washing liquid 25.

In order to initiate obtaining a sample, the sample-taking container 3 may also be subjected to superatmospheric pressure, for example by introducing nitrogen, until the bursting disk 27 at the free end of the inlet channel 26 breaks.

During the mixing of the sample with the transport fluid 25 a part of the sample is dissolved, a part is condensed in the transport fluid 25 and the rest remains in gas form and collects in the dome 6, or remains in the form of small bubbles distributed in the transport fluid 25. Through inactive iodine additions and a variation of the pH value of the washing liquid 25, elementary organic iodine, CO, $CO_2$ and other gas from the sample are also retained in the washing liquid 25.

When sample-taking containers 3 according to FIGS. 2 and 3 are used, the inlet channel 26 is flushed with the transport fluid 25 before the latter is drawn off, with the fluid being forced one or more times to the height of the bursting disk 27 through pressure variations in the line 10 and the sample-taking container 3. The level height 28 of the washing liquid 25, preferably in the inlet channel 26, is thus varied by pressure changes in the transport fluid, with the washing liquid 25 being raised, after the sample has flowed in, at least once to the height of an inlet opening at the free end of the inlet channel 26 for the sample.

After adequate flushing of the inlet channel 26, the transport fluid 25 containing a part of the sample, together with the gas mixture contained in the dome 6, is conveyed outwards into the sample sorting device 11 by a sudden pressure reduction in the line 10.

The above-described flushing is unnecessary in the embodiment of the sample-taking container 3 according to FIG. 4, so that in this embodiment the sudden pressure reduction for conveying the sample to the sample sorting device 11 is effected immediately after the bottom end of the gas line 7 comes into action as a venturi nozzle.

In each case a mixture of carrier gas, gaseous constituents of the sample and the transport fluid, which likewise contains constituents of the sample, is conveyed into the sample sorting device 11 through the line 10. This mixture is prepared, as far as is necessary, in the sample sorting device 11 and thereupon is filled into the sample transport containers 20 by means of the sample draw-off device 12.

In the application of the process according to the invention it is ensured, because of the very short, back-washed inlet channel 26 or because of the absence of an inlet channel, that practically all of the constituents of a sample are contained in the aforesaid mixture and consequently are detectable in the assessment of the samples.

I claim:

1. A process for obtaining a sample from an atmosphere in a closed gastight vessel, which comprises:
   passing a sample through a venturi nozzle immediately upon entry of the sample into a sample-taking container in a vessel;
   mixing the sample in the venturi nozzle with a transport fluid serving as a washing liquid; and
   subsequently discharging gaseous constituents of the sample being soluble and/or condensable in the washing liquid together with the washing liquid from the sample-taking container and from the vessel by triggering by a pressure reduction.

2. The process according to claim 1, which comprises discharging the gaseous constituents and the washing liquid from a reactor safety vessel of a nuclear power station.

3. The process according to claim 1, which comprises flushing an inlet channel through which the sample flows before reaching the venturi nozzle with the washing liquid contained in the sample-taking container, before an assessment of the sample.

4. The process according to claim 1, which comprises setting a velocity of flow of the sample in the venturi nozzle to be slightly below a critical nozzle velocity, as long as no condensation of the sample occurs in the washing liquid, increasing the velocity of flow to the critical nozzle velocity as soon as the sample at least partially condenses in the washing liquid, and operating the sample-taking container under conditions of pressure and temperature prevailing in the vessel.

5. The process according to claim 4, which comprises setting the velocity of flow of the sample in the venturi nozzle to be 10% to 30% below the critical nozzle velocity.

6. The process according to claim 1, which comprises reacting gaseous constituents of the sample and of the transport fluid chemically with one another.

7. The process according to claim 3, which comprises varying a level height of the washing liquid by pressure changes in the transport fluid, and raising the washing liquid at least once after the sample has flowed in to a height of an inlet opening at a free end of the inlet channel for the sample.

8. The process according to claim 3, which comprises carrying out the step of varying the level height of the washing liquid in the inlet channel.

9. The process according to claim 1, which comprises adjusting a difference in pressure between an atmosphere in the vessel and an interior of the sample-taking container to up to 5000 hPa.

10. The process according to claim 1, which comprises adjusting a temperature of the washing liquid at the beginning of a sample taking process to be slightly lower than that of an atmosphere in the vessel.

11. The process according to claim 1, which comprises retaining elementary organic iodine, CO, $CO_2$ and other gas from the sample in the washing liquid, by inactive iodine additions and variation of the pH value of the washing liquid.

12. The process according to claim 1, which comprises diluting the washing liquid after being drawn off by suction from the sample-taking container, until the radioactivity of the sample is lower than $10^9$ Bq/m$^2$.

13. The process according to claim 1, which comprises separating the sample before its assessment into gaseous constituents and washing liquid containing other parts of the sample, and drawing off the sample by suction through a throttle working in the laval velocity range, through a water separator and into a vacuum vessel.

14. The process according to claim 1, which comprises distributing each individual sample over a plurality of transport containers for transport purposes.

15. The process according to claim 3, which comprises subjecting the sample-taking container to superatmospheric pressure until a bursting disk at a free end of the inlet channel breaks, to initiate obtaining a sample.

16. The process according to claim 15, which comprises carrying out the step of subjecting the sample-taking container to superatmospheric pressure by introducing nitrogen.

* * * * *